United States Patent Office 2,815,371
Patented Dec. 3, 1957

2,815,371

PRODUCTION OF N-AMINOALKYL-SULFONIC ACIDS

Hans Feichtinger and Siegfried Puschhof, Duisburg-Beeck, Germany, assignors to Ruhrchemie Aktiengesellschaft, Oberhausen-Holten, Germany, a corporation of Germany No Drawing. Application August 31, 1954,
Serial No. 453,410

Claims priority, application Germany September 4, 1953

3 Claims. (Cl. 260—513)

This invention relates to improvements in the production of n-aminobutane-sulfonic acids.

It is known that alkyl amine hydrochlorides which are chlorinated in the carbon chain may be produced by treating aliphatic n-alkylamine hydrochlorides with gaseous chlorine in the presence of suitable solvents. The chlorine introduced to the n-alkylamino hydrochloride is not added at a single position in the carbon chain, but distributes statistically at several positions, thus, for example, forming isomers having the chlorine at different positions. Minor quantities of dichlorinated amine hydrochlorides are also formed in the chlorination. If chlorinated amine hydrochlorides are hereinafter referred to, they shall always be understood to be a mixture of monochlorinated and polychlorinated compounds. Due to the degree of chlorination observed, polychlorinated compounds are present only in a small amount. Degree of chlorination is understood to be the stoichiometrical amount of chlorine entering into the aliphatic carbon skeleton per mol amine hydrochloride. This amount of chlorine can easily be determined by known analytical methods from the difference of the total chlorine present and the ionically combined chlorine.

It has now been found in accordance with the invention that chlorinated n-butylamino hydrochlorides, which contain a stoichiometric quantity of 0.25–2 chlorine atoms in the molecule, may easily be converted into n-aminobutane-sulfonic acids by reaction with an aqueous sodium sulfite solution at elevated temperature. It is particularly advantageous if the aliphatic carbon chain contains 0.5–1 gram atoms chlorine per molecule. It is not absolutely necessary, however, to exactly observe these limits of chlorination. It is also possible to work with lower or still higher quantities of chlorine. It is of advantage in any case, however, to use quantities of chlorine which are somewhat lower than corresponds to one gram atom of chlorine per molecule. In this case, there are formed only small amounts of polychlorinated compounds which are only difficult to convert with sodium sulfite.

The degrees of chlorination stated in the following examples shall by no means limit the process of the invention but show a particularly favorable embodiment of the same. Deviating from this, substantially lower amounts of chlorine, such as 0.25 or 0.4 gram atoms per molecule may be used. Naturally, only a low conversion and a correspondingly reduced yield is to be expected under these circumstances.

The production of the n-aminobutane-sulfonic acid is effected in accordance with the following equation:

$$\text{n-C}_4\text{H}_8\text{Cl.NH}_2\text{.HCl} \xrightarrow[\text{H}_2\text{O}]{\text{Na}_2\text{SO}_3}$$

$$\text{NH}_2\text{CH}_2\text{CH}_2\text{CH}_2\text{CH}_2\text{SO}_3\text{H} + \text{NH}_2\text{CH}_2\text{CH}_2\text{CH(SO}_3\text{H)CH}_3 + 2\text{NaCl}$$

The reaction is preferably effected in the aqueous phase at elevated temperatures. The reaction may be conducted without any difficulty by boiling the reactants under a reflux condenser or by heating the same under pressure in a sealed reaction vessel, such as a sealed tube. The reaction time is dependent upon the temperature used. Thus, for example, the reaction will proceed within 20 hours at a temperature of 100° C. while a reaction period of only 5 hours is required at 150° C. After completion of the reaction by heating, the sulfonic acid may be obtained in the form of its hydrochloride solution from the evaporated reaction mixture after the addition of concentrated hydrochloric acid and the separation of the sodium chloride formed. The solid sulfonic acid may be obtained in crystallized form from the hydrochloride solution by evaporation and precipitation with absolute alcohol.

The reaction in accordance with the invention is most preferably conducted in an aqueous medium which contains both of the reactants in a homogeneous phase. The substances reacting with one another are preferably used in approximately equimolecular quantities. It is possible, however, to use an excess of sodium sulfite.

The concentration of the two reactants may be varied within wide limits. In general, the concentration of the solution containing sodium sulfite and chlorinated butylamine hydrochloride should range between 20 and 50% by weight. Deviating from this, however, the conversion may also be effected with other concentrations.

Corresponding to the statistic distribution of the halogen atoms in the aliphatic carbon chain of the n-alkylamine hydrochlorides, the reaction products constitute a mixture of different sulfonic acids. Thus, for example, from chlorinated n-butylamine hydrochloride and sodium sulfite, a mixture of 30% by weight of 4-aminobutane-sulfonic-1 acid and 70% by weight of 1-aminobutane-sulfonic-3 acid is obtained. When using other chlorinated alkylamine hydrochlorides, the reaction proceeds in a similar manner with the production of several isomeric aminoalkyl-sulfonic acids.

The following examples are given by way of illustration and not limitation:

*Example 1*

Chlorinated n-butylamine hydrochloride in amount of 30 gms. containing 0.95 gram atoms chlorine in its aliphatic carbon chain, and 60 gms. sodium sulfite, were dissolved in 250 cc. of water. The solution was heated for 20 hours at 100° C. under a reflux condenser. Thereafter, the water was distilled off under vacuum and the residue was mixed with concentrated hydrochloric acid. The sodium chloride which separated was filtered off. The filtrate was evaporated to dryness on a water bath. The remaining viscous residue, while warm, was dissolved in a small quantity of absolute alcohol. Following this, the aminobutane sulfonic acid was precipitated with about 250 cc. of absolute alcohol.

The finished product obtained consisted of a mixture of 30% by weight of 4-aminobutane-sulfonic-1 acid and 70% by weight of 1-aminobutane-sulfonic-3 acid.

*Example 2*

Chlorinated n-butylamine hydrochloride in amount of 30 gms. containing 0.95 gram atoms chlorine in its aliphatic carbon chain, and 50 gms. sodium sulfite, were dissolved in 100 cc. of water. The solution was heated for 5 hours at 150° C. in a sealed glass tube. The reaction product obtained was processed in the manner described in Example 1.

The finished product obtained consisted of 6.8 gms. n-aminobutane-sulfonic acid having the composition as mentioned in Example 1.

We claim:

1. Process for the production of 4-aminobutane-sulfonic acid-1 and 1-aminobutane-sulfonic acid-3, which comprises heating a mixture of chlorinated aliphatic n-butylamino hydrochlorides containing 0.25–2 atoms of chlorine in the aliphatic chain with an aqueous sodium sulfite solution to thereby form a mixture of aminobutane-sulfonic acids consisting of 1-aminobutane-sulfonic acid-3 and its isomer 4-aminobutane-sulfonic acid-1.

2. Process for the production of 4-aminobutane-sulfonic acid-1 and 1-aminobutane-sulfonic acid-3, which comprises heating a mixture of chlorinated aliphatic n-butylaminohydrochlorides containing about 0.95 atom of chlorine in the aliphatic chain with an aqueous sodium sulfite solution to thereby form a mixture of aminobutane-sulfonic acids consisting of 1-aminobutane-sulfonic acid-3 and its isomer 4-aminobutane-sulfonic acid-1.

3. Process according to claim 2, in which the mixture of aminobutane-sulfonic acids is recovered by evaporating the water present in the reaction mixture after said heating, contacting the residue with concentrated hydrochloric acid, separating the sodium chloride formed, evaporating the remaining reaction mixture and precipitating the butylamino-sulfonic acid with anhydrous alcohol.

References Cited in the file of this patent

UNITED STATES PATENTS 2,316,538     Orthner et al. _____ Apr. 13, 1943

OTHER REFERENCES

Cortese: Jour. Am. Chem. Soc., vol. 58, p. 191 (1936).